April 26, 1932.  F. B. KEOGH  1,855,189
POUND OR PIECE CUTTING MACHINE
Filed Oct. 29, 1929   2 Sheets-Sheet 2
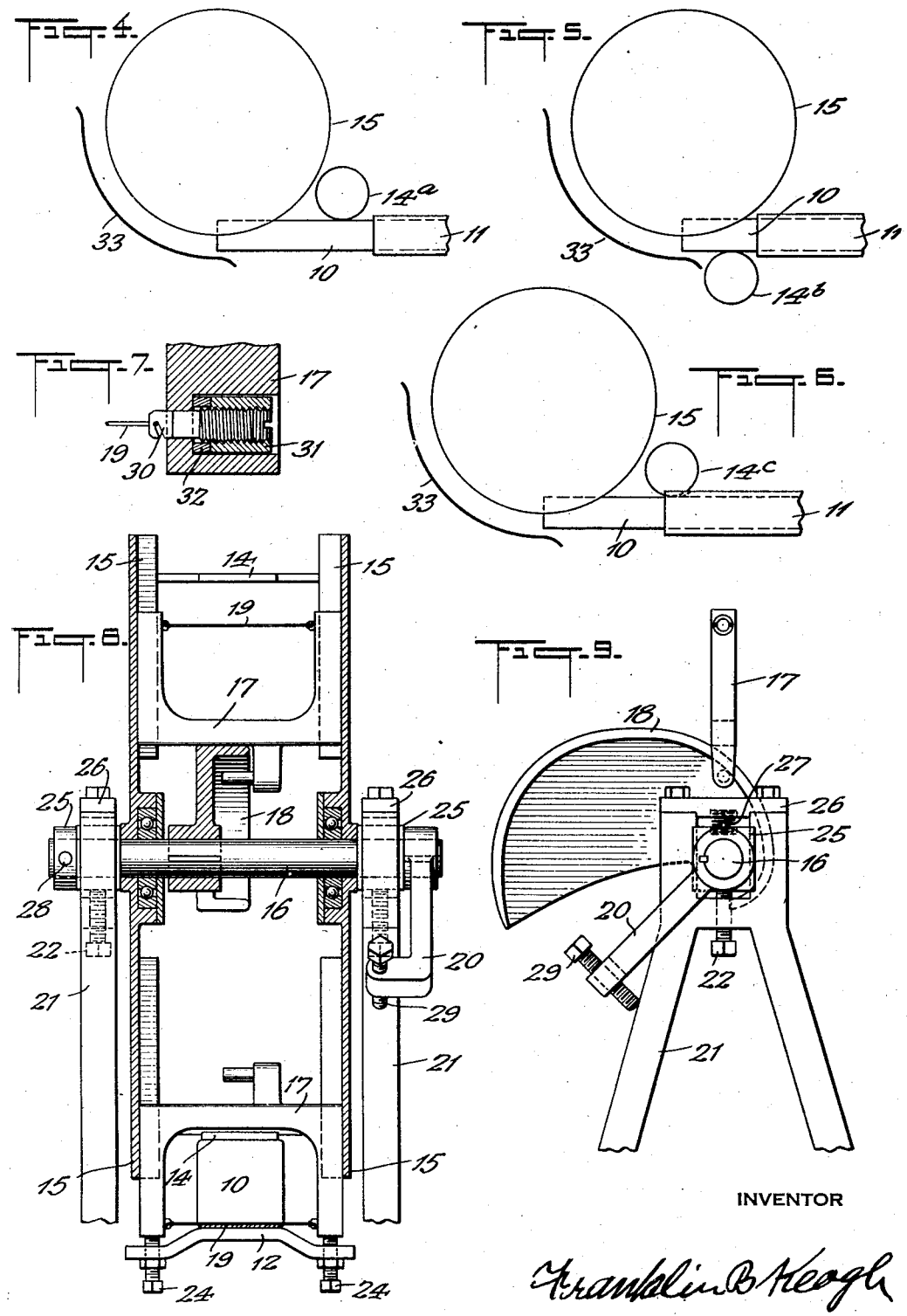
INVENTOR
Franklin B Keogh Patented Apr. 26, 1932

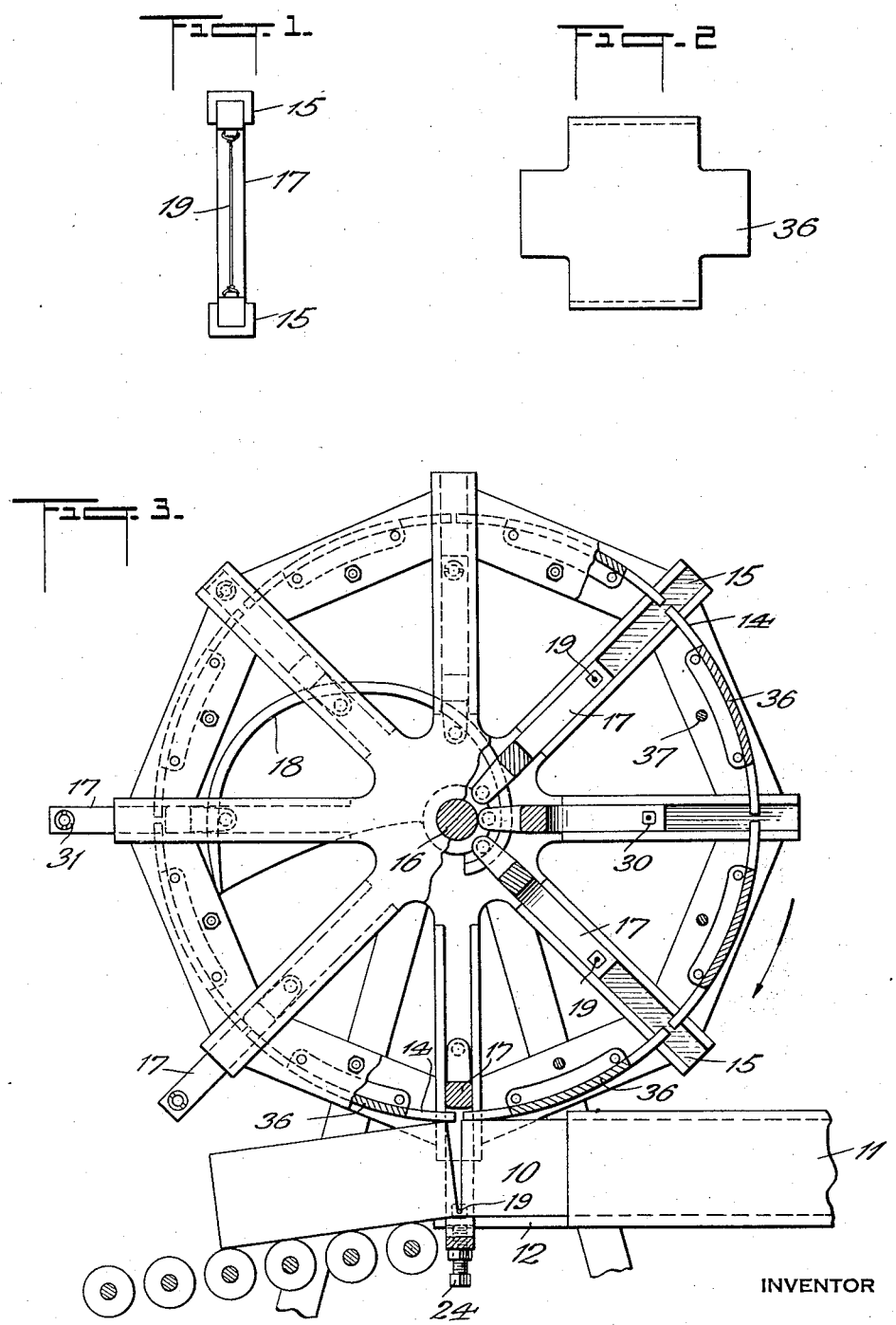

1,855,189

UNITED STATES PATENT OFFICE

FRANKLIN B. KEOGH, OF PEEKSKILL, NEW YORK

POUND OR PIECE CUTTING MACHINE

Application filed October 29, 1929. Serial No. 403,342.

One object of my invention is to provide a machine for cutting a continuous bar of yeast, or other materials of like consistency which should and must be cut by a wire, into pounds or pieces the length of which may continually change or may be fixed; the apparatus being adapted to operate automatically by use of friction exerted on it by the fed product.

Other objects of the invention are to provide a machine of the character indicated with novel means for adjusting to the proper cutting angle, and also to change the length of the cut pound or piece while the machine is operating, furthermore to provide that the cutting agent (a wire) will not mark or mutilate either surface after the cut has been made.

These aims and other advantageous ends I secure as hereinafter set forth, reference being made to the two accompanying drawings in which;

Figure 1 is an end view of frame for holding the cutting wire, and the arms in which frame travels.

Fig. 2 is a segment of the contact roller.

Fig. 3 is a side elevation of the rotating part, also showing forming nozzle from which product exudes.

Figs. 4 and 5 and 6 are diagrammatic.

Fig. 7 is a section showing method of holding and tightening the wire.

Fig. 8 is a front view of the assembled machine, partially in section.

Fig. 9 is a side view showing supports.

In the above mentioned drawings 11 represents a forming nozzle from which is forced a continuous length of yeast, or other material, by means of pressure from the rearward. On account of such pressure by the time product emerges from nozzle 11 it is a practically homogeneous body, relatively stiff, and rectangular in cross section. Placed in front of nozzle is a horizontal plate 12, the top surface of which coincides with bottom line of product and serves as a table on which said product may slide. Operation is as follows. When product 10 is forced from nozzle 11, slides along on stationary plate 12, touches contact roller or pulley 14 and by friction starts spiders or sets of arms 15 revolving on shaft 16, the frame 17 held up by stationary cam 18 reaches end of cam and frame 17 drops by gravity and wire 19 cuts product. Pieces are then carried away by roller conveyor which must be pitched at an angle to insure the prompt removal of the cut cake in order that face of same may not be damaged by the advancing wire. It will be noted that the speed of the cutting wire is now faster than speed of the product and therefore will clear and not injure face of cake to be cut.

After the frame 17 has performed its cutting function the continuing revolution of the spiders or sets of arms 15 carries part 17 to a point where it is caught up by the cam 18 and gradually returned to a position ready to fall again.

In Figure 8 the frame 17 is shown in its lowest position having just fallen. An adjustable stop is provided at this point by means of the screw 24, so that wire 19 will not touch plate 12, also part 17 must not bang against roller or pulley 14. Figure 9 illustrates supports 21, cap for same 26, compression spring 27, and bearings 25 for shaft 16. Figure 9 also shows an adjusting screw 22, which raises or lowers the revolving parts so as to get the right amount of contact to properly drive same. Figure 9 also shows cam 18 and arm 20 which are both keyed to shaft 16. By means of the screw 29, the cam 18 is adjusted to such a position that the cuts will be at an angle of 90 degrees to the flow of the product, meaning with square ends.

After this has been made right for a normal speed then set-screw 28 is tightened. Figure 7 is a detail of the method used to hold and tighten the cutting wire. Hook 30 has a squared end which is held by the square in frame 17. Threaded sleeve 31 is turned by means of screw driver slot and wire made taut, the rubber washer 32 acting as a cushion.

Since length of piece to be cut and shape in cross section are predetermined by manufacturers standards the drawings cannot give the exact sizes of parts. Also because materials vary in density they offer a different resistance to the cutting wire, and as the cut is accomplished by the gravity fall of the frame, this frame must be of suitable weight so wire will cut through product when frame falls from a certain height.

In designing the cutting machine to operate as shown in Figure 3 it must be remembered that segment 36, plus slot, is the exact length of one cake. Then determine the necessary weight of frame 17 and the height of fall to cut through the product. When proper clearances are allowed the length of sets of arms 15 can be decided on and the diameter of contact roller 14.

This contact roller 14 is cast as a pulley, turned and faced, arms and hub cut out, and after being securely bolted to sets of arms 15 then slots wide enough to allow cutting wire to pass through are cut across face. This contact roller or pulley, part 14, has now been cut into segments, part 36. The circumference of this contact roller before splitting must be an exact multiple of the length of cake to be cut. Number of radial slots in the sets of arms 15 may be greater or less than the eight shown in Figure 3.

Other forms of this invention involving the same principles are shown in Figures 4, 5, and 6. These are for use where the density of the product is changeable but an exact weight is required and therefore a continual adjustment made necessary to change the length of the cut cake. This change of length is accomplished by turning the screw 22. Raising the shaft 16 and revolving parts increases length of cake. Lowering it decreases length of cake. Furthermore the segment 36 would now be in the way and since, as is shown in Figure 3, it also acted as a brace to tie the sets of arms 15 together, therefore in adopting schemes such as shown in Figures 4, 5, and 6, tie rods 37 must be supplied and located in the same position. Such tie rods must of course clear the cam 18 which is always stationary. Also shoe piece 33 must be provided to keep frames 17 from falling out. In all cases power is taken from the product leaving nozzle, however contact rollers are now located as at 14a or 14b or 14c, must be adjustable to get the right amount of friction to drive, and sets of arms 15 may be driven from same by chain or gears or belt.

Note that the shaft which holds the rotating sets of arms is adjustable vertically so that when using contact roller or pulley 14 the right amount of friction to drive can be obtained; and so that when using contact rollers 14a or 14b or 14c the length of the cut pieces may be changed. The two rotating sets of arms 15 are designed with radial slots or ways so as to guide the vertical movement of frames when product is being cut; and also to hold frames at their greatest distance from the center of shaft for the one quarter revolution immediately following the cut in order that cutting wire will touch neither the bar nor the severed piece. The periphery of the eccentric cam 18 is so designed as to return the frames 17 gradually after same have fallen. Also provision is made to adjust cam in a rotary direction for the purpose of assuring square ends on the cut pieces.

Care must be taken in applying the required pressure to drive the apparatus that the product is not bulged or cracked. If a smooth or finished face on the contact roller or pulley will not produce sufficient friction to drive, then such roller or pulley may have grooves (of suitable depth) cut across the face. The same result may be obtained by having raised letters on the face of roller giving the name of the product, or the weight of the cake, or a trade mark. This embossing would act as a driving force.

Now having described my invention and how it operates, what I claim and desire to secure by Letters Patent is:

In a machine of the character set forth the combination of; a pulley driven by contact of the material extruded which drives two sets of arms rotatably mounted on a shaft vertically adjustable while the machine is in operation, said sets of arms having radial slots which guide slidable frames carrying cutting wires so that the wires will not damage the on-coming bar after the cut has been made, said frames being of such correct weight that the taut wire on same will part off the product when frames are allowed to fall by gravity from a pre-determined height, and an eccentric cam also on the shaft and adjustable rotatably while the machine is in operation said cam so shaped and so positioned that it will gradually move the frames toward the center of the supporting shaft after the cut has been made and allow the frames to drop off of it just before the cut is made; the entire unit to function substantially as stated above and for the purpose set forth.

In testimony whereof, I have signed my name to this specification.

FRANKLIN B. KEOGH.